United States Patent [19]

Cobb

[11] Patent Number: 5,835,749

[45] Date of Patent: Nov. 10, 1998

[54] METHOD AND APPARATUS FOR PROVIDING DYNAMICALLY LINKED LIBRARIES

[75] Inventor: Jeffrey R. Cobb, Sunnyvale, Calif.

[73] Assignee: Apple Computer, Inc., Cupertino, Calif.

[21] Appl. No.: 435,142

[22] Filed: May 5, 1995

[51] Int. Cl.⁶ .................................................. G06F 9/445
[52] U.S. Cl. ........................................ 395/500; 395/700
[58] Field of Search ..................................... 395/500, 700

[56] References Cited

U.S. PATENT DOCUMENTS

| | | | |
|---|---|---|---|
| 5,375,241 | 12/1994 | Walsh | 395/700 |
| 5,408,665 | 4/1995 | Fitzgerald | 395/700 |
| 5,432,940 | 7/1995 | Potts et al. | 395/700 |

OTHER PUBLICATIONS

"Inside Macintosh: PowerPC System Software," Apple Computer, Inc., 1994, Addison–Wesley Publishing Company.

*Primary Examiner*—Kevin J. Teska
*Assistant Examiner*—Vuthe Siek
*Attorney, Agent, or Firm*—Hickman Beyer & Weaver

[57] ABSTRACT

According to the present invention a variety of methods and apparatus for providing dynamically linked libraries are taught. A "standard DLL" is a dynamically linked library (DLL) which is pulled into the data closure of a process by direct reference in the process' root DLL or by direct reference in other DLLs present in the data closure. In contrast, the present invention teaches a "phantom DLL" which is pushed into the data closure of an executable process and is not directly referenced either by the root DLL or by other DLLs present in the data closure. In some embodiments the phantom DLL includes an anonymous initialization routine which the binding manager executes when the phantom DLL is added to a new process data enclosure. By executing the initialization routine the phantom DLL has an opportunity to execute and impact the computing environment of the new process. A method for dynamically binding a root DLL and a plurality of DLLs into an executable process on a computer system includes the steps of storing a collection of standard DLLs and phantom DLLs in a memory of the computer system, receiving a bind command within an operating system function, determining which standard dynamically linked libraries are needed by the root DLL, and determining which phantom dynamically linked libraries are to be used within the executable process.

27 Claims, 4 Drawing Sheets

METHOD AND APPARATUS FOR PROVIDING DYNAMICALLY LINKED LIBRARIES

TECHNICAL FIELD

This invention relates generally to computer operating systems, and more particularly to methods and apparatus for providing dynamically linked libraries.

BACKGROUND ART

There are a number of computer operating systems available for desktop computers, workstations, etc. One popular type of operating system (used, for example, on Unix and Macintosh® computer systems) utilizes dynamically linked library (DLL) architecture. With a DLL architecture, a "root fragment"(the term "fragment" being used interchangeably with the term DLL) is dynamically linked with a other import library fragments to achieve an executable process having a desired functionality.

Dynamically linked computing environments differ from an entirely different group of operating system architectures known as static computing environments. By way of explanation, in dynamically linked environments, external code references (i.e. import symbols) are resolved at run time. This contrasts to the static computing environment where all elements of the code are linked and bound prior to producing the final application which is then fully prepared to execute at runtime.

One primary advantage of the static computing environment is that applications launch very quickly because no binding is required during startup. However, this speed is gained only at the expense of flexibility. The loss in flexibility is because application functionality can only be changed by completely recompiling (which would be impractical if not impossible for most situations, say for example an operating system which is stored mainly in ROM) or adding patch code into the system.

In the dynamically linked computing environment, fragments can be written such that much of their functionality is gained from external dynamically linked libraries (DLLs) by way of import symbols which are resolved at run time. Thus a root fragment's functionality may be enhanced by simply replacing the appropriate imported DLLs when the process is not running. This adds great flexibility within the DLL architecture operating system.

In the computing environment of the present invention, the basic unit of executable code and its associated data is termed a "fragment" or a "dynamically linked library." Before any fragment can be executed on a computer system, it must be loaded into the computer system's memory and prepared for execution. Fragment preparation consists mainly of resolving at runtime any import symbols in the fragment that reference code or data exported by other fragments. The resolution of import symbols is accomplished through a process called "binding" wherein the address of the code or data corresponding to the import symbol is found and stored in the fragment by a "binding manager", which is a service typically provided by the operating system.

The resolved symbols are often stored in a "table of contents" format having a pointer to each routine or data item that is imported from some other fragment, as well as pointers to the fragment's own static data. These pointers are then used to properly execute the fragment. Once prepared, the initial fragment (termed the "root fragment") plus all subsequently bound fragments make up an executable process.

DLLs can be loosely divided into three different categories: applications, import libraries, and extensions. Typically, applications are fragments which have a user interface and are designed to function interactively with the user. Often applications do not export symbols to other fragments but rather serve as a root fragments, providing some root functionality and importing other necessary functionality.

In contrast, import libraries typically contain code and data generated solely for the purpose of being accessed by other fragments. For example, an import library entitled TrigLib (for trigonometry library) may include export symbols such as sin, cos, and tan. If an application program wishes to use these functions, the application would just include TrigLib's sin, cos, and tan as import symbols. Then when the application program is launched, the binding manager resolves all import symbols (e.g. those from TrigLib) listed in the application. In one example, the symbol resolution is performed by creating a connection to TrigLib by way of the application's table of contents.

Extensions, the third category of fragments, are those fragments which enhance or extend the functionality of other fragments. Extensions are different than import libraries in that extensions must be known by the root fragment or subsequent DLLs and explicitly connected during the execution of the new process. Thus the binding manager is not explicitly responsible for resolving the interconnection between extension DLLs and other types of DLLs.

Once an application has been launched and the binding manager has completed preparation, the end result is a new, self-sufficient executable process with an associated data closure. The closure contains the root fragment as well as instances of all the import libraries required to resolve all the import symbols present in both the root fragment and the import libraries. The root fragment is the fragment which includes some root functionality as well as a list of import symbols.

As should be apparent, the dynamically linked computing environment may provide, through its runtime binding, a far more flexible computing environment than the aforementioned static computing environment. However, in present dynamically linked library computing environments there is no method for "pushing" additional functionality into the closure. This is because services can only be "pulled"(i.e. directly referenced) into the enclosure.

In order to demonstrate the need for pushing a service into a data closure, the well known case of patching will now be examined. In order to provide programmers of application code flexibility and to further allow creativity and innovation, computer operating systems often allow applications to install "patches" within the operating system code. In explanation, a "patch" is a piece of code which replaces or augments a given function already implemented on the computer.

When a patch replaces a given function, any client calls made to the given function are redirected to the patch. The patch in turn performs the requested service and, if necessary, returns any results of the call to the client. In a similar manner, when a patch augments a given function, any client calls made to the given function are redirected to the patch. The patch then performs any preprocessing and passes the call along to the given function. The given function may return results directly to the client, or return results to the patch. If desired, the patch may perform post-processing and, if necessary, return the results of the call to the client.

While patching is useful to the application programmer, it is a limited tool as it can only address problems and add desired functionality which the application programmer is aware of at the time the application is written. This will be discussed in terms of the previously discussed math application which imported the import library TrigLib. For the sake of the example, a new import library called SuperTrigLib is introduced which exports the symbols supersin, supercos, and supertan. Assume that these functions are across the board more advantageous (faster, use less memory, etc.) than the TrigLib's functions sin, cos, and tan. Ideally the math application would utilize the functionality available in the SuperTrigLib by patching the TrigLib with the SuperTrigLib. However, since the application is unaware of the SuperTrigLib, this would be impossible without a method for "pushing" SuperTrigLib into the closure of the math application. Currently the only solution is to rewrite the math application to import the symbols of the SuperTrigLib.

As another example, take the case of a "virtual user." When designing operating systems, applications, etc., designers must perform thorough testing of the software. One sensible method is to implement a so-called virtual user DLL which mimics a user's operation. Thus the virtual user must be able to drive the entire computer system in a manner similar to a user. In the well known case of the Macintosh® Operating System, one method for doing this is to write each DLL responsive to the virtual user. However, this would require extra overhead within each DLL which might be driven by the virtual user.

Another approach for integrating the virtual user into the Macintosh® Operating System involves writing the Macintosh® event manager to respond to the virtual user. As will be appreciated, the event manager is that component of the Macintosh® operating system which allows applications to monitor user's actions with devices such as a mouse, a keyboard, and a keypad.

However, creating an event manager which imports the virtual user would not be satisfactory either as it is undesirable to always have the virtual user present. An even better method would involve the event manager operating such that the event manager's interface accepts a registration call from the virtual user. However, this does not address the issue of bringing the virtual user into the event manager's closure, which must happen before the virtual user can register its existence with the event manager. Thus, once again, the issue of pushing the service into the closure has arisen.

DISCLOSURE OF THE INVENTION

In accordance with the purpose of the present invention, a variety of methods and apparatus for providing dynamically linked libraries are taught. A first aspect of the present invention teaches a method for dynamically binding a root fragment and a plurality of dynamically linked libraries into an executable process on a computer system. In an initial step, a collection of standard dynamically linked libraries and phantom dynamically linked libraries are stored in a memory of the computer system. The standard dynamically linked libraries are known to at least one of the root fragment and another of the standard dynamically linked libraries. In contrast, the phantom dynamically linked libraries are not known to either of the root fragment or the standard dynamically linked libraries needed by the root fragment.

The method further includes steps such as receiving a bind command within an operating system function executing on the computer system, determining within the binding manager which standard dynamically linked libraries are needed by the root fragment, and determining which phantom dynamically linked libraries are to be used within the executable process. The execution of the bind command binds dynamically linked libraries with a root fragment into a new executable process, the operating system function initiating a binding manager executing on the computer system to perform the binding process, the binding manager having access to the DLL collection.

In a separate aspect of the present invention, a second method for dynamically binding a root fragment and a plurality of dynamically linked libraries into an executable process on a computer system is disclosed. The method comprises the steps of (a) storing a DLL collection of standard dynamically linked libraries and phantom dynamically linked libraries in a memory of a computer system, (b) receiving a bind command within a service executing on the computer system to bind dynamically linked libraries with a root fragment into a new executable process, the service initiating the binding process, (c) determining which standard dynamically linked libraries are needed by the root fragment, wherein the standard dynamically linked libraries are known to at least one of the root fragment and another of the standard dynamically linked libraries, the phantom dynamically linked libraries not known to either of the root fragment or the standard dynamically linked libraries needed by the root fragment.

After performing steps (a)–(c), the method additionally teaches (d) selecting an unprocessed phantom dynamically linked library, (e) determining if the selected phantom dynamically linked library is intended to patch a one of the standard dynamically linked libraries needed by at least one of the root fragment and another of the standard dynamically lined libraries needed by the root fragment, and, if so, requesting that the selected phantom dynamically linked library be added into the executable process, (f) requesting that the selected phantom dynamically linked library be added into the executable process if it is determined in step (e) that the selected phantom dynamically linked library is not intended to patch, (g) marking the selected phantom dynamically linked library as processed, and (h) marking each phantom dynamically linked library which has not been added into the executable process as unprocessed when the selected phantom dynamically linked library is added to the executable process in step (e). The method further teaches repeating the necessary ones of steps (d)–(h) until each of the phantom dynamically linked libraries are marked as processed.

According to an apparatus embodiment of the present invention, a structure for an executable process includes a root fragment having a root functionality of a desired process and at least one phantom dynamically linked library bound to the executable process. In this embodiment, the at least one phantom dynamically linked library performs a phantom library function that is not known by the root fragment. The combination of the root fragment and the at least one phantom dynamically linked library constitutes an executable process on a computer system.

In yet another embodiment of the present invention, a binding system for binding dynamically linked libraries to a root process includes a computer system having a central processing unit and memory coupled to the central processing unit, a DLL collection stored in memory, a root fragment stored in memory, a binding manager stored in memory and executing on the central processing unit, and a service stored in the memory and executing on the central processing unit.

The DLL collection includes both standard and phantom dynamically linked libraries (DLLs) and is accessible by the binding manager. In explanation, standard DLLs are known to at least one of the root fragment and another of the standard dynamically linked libraries, while phantom DLLs are not known to either of the root fragment or the standard dynamically linked libraries. The binding manager is able to determine which standard DLLs are needed by the root fragment and the service is able to determine which phantom dynamically linked libraries are to be used with the root fragment.

BEST MODES FOR CARRYING OUT THE INVENTION

According to the present invention, a variety of methods and apparatus for providing a phantom dynamically linked library (DLL) in an executable computer process are disclosed. As defined herein, a "standard DLL" or "standard fragment" is a dynamically linked library which is pulled into the data closure of a process by direct reference in the process' root fragment or by direct reference in other DLLs present in the data closure. In contrast, the present invention teaches a "phantom DLL" or "phantom fragment" which is a dynamically linked library which has been pushed into the data closure of an executable process and is not directly referenced either by the root process or by other DLLs present in the data closure. In some embodiments the phantom DLL includes an anonymous initialization routine which the binding manager executes when the phantom DLL is added to a new process data enclosure. By executing the initialization routine the phantom DLL has an opportunity to execute and impact the computing environment of the new process.

Figure 1:
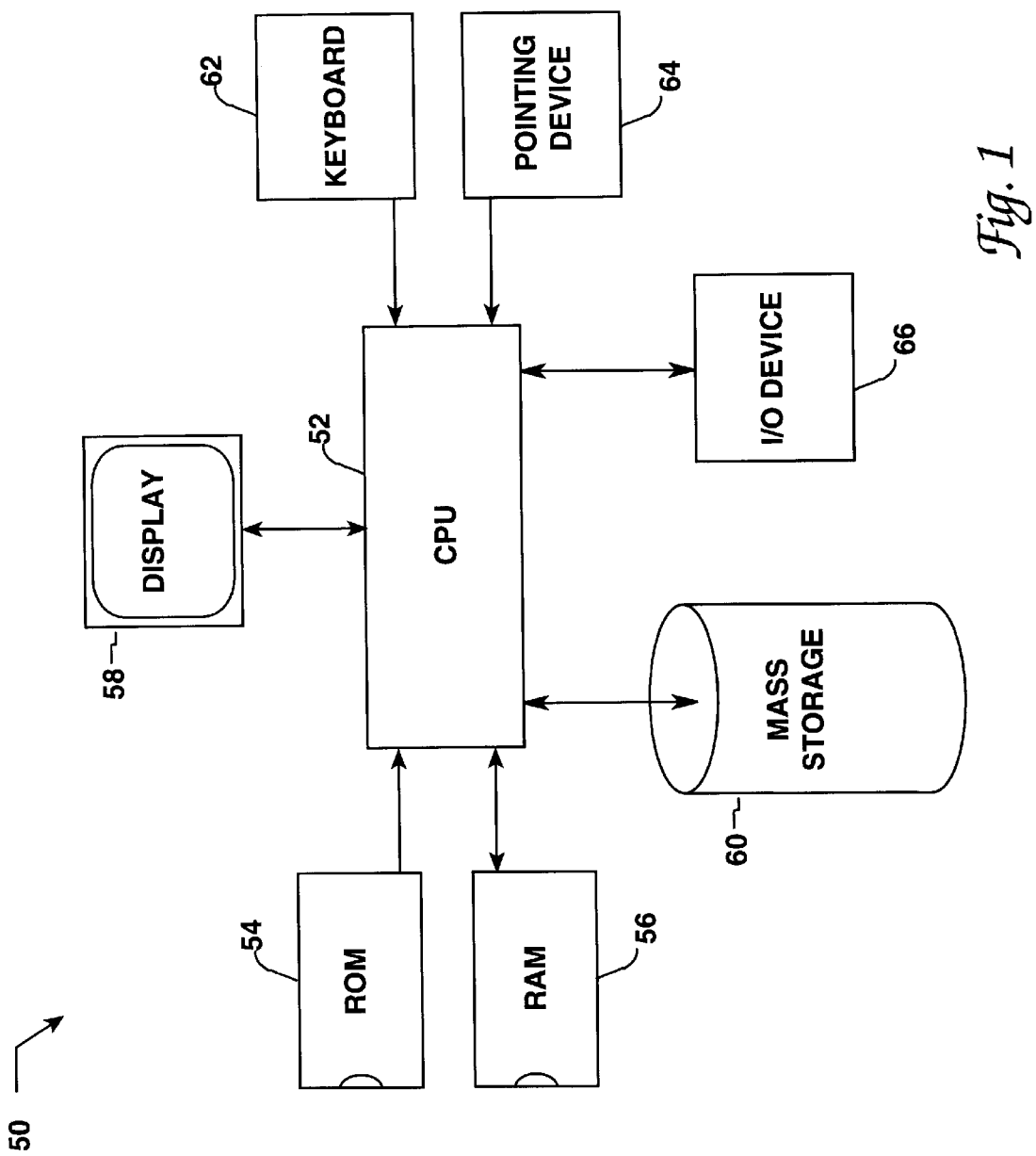
FIG. 1 diagrammatically illustrates a general purpose computer system suitable for use with the present invention.

In the described embodiments of the present invention, standard dynamically linked libraries, phantom dynamically linked libraries, data closures and executable processes are resident on a computer system which may take any suitable form. By way of example, a representative computer system 50 is illustrated schematically in FIG. 1. The typical computer system 50 includes a central processing unit (CPU) 52 coupled to read only memory (ROM) 54 and to random access memory (RAM) 56. The computer system 50 may optionally include elements such as a display 58, a mass storage device 60, a keyboard 62, a pointing device 64, and an input/output device 66.

As will be appreciated by those skilled in the art, CPU 52 includes a microprocessor and any additional circuitry or device drivers necessary to control the computer system. For instance, the CPU 52 may include a keyboard controller which provides an interface between the microprocessor to the keyboard 62. ROM 64 is typically persistent memory accessible by the CPU 52 which contains the operating system instructions either in an executable format or in a compressed format which is expanded when the computer system 50 boots. RAM 56 is typically transient memory and is used as "scratch pad" memory by the operating system and/or any applications implemented on the computer system 50. For example, if a portion of the operating system present in ROM 64 is in compressed format, it may be expanded and stored into RAM 56.

Devices such as display 58, keyboard 62 and pointing device 64 work together to provide a user interface for the computer system 50. Of course, these three devices are optional as the computer system 50 may perform meaningful work without any of display 58, keyboard 62, and pointing device 64.

Mass storage device 60 is coupled with CPU 52 and may be any mass storage device such as a hard disk system, a floptical disk system, a tape drive or the like. Mass storage device 60 generally includes code fragments such as applications, import libraries, and extensions which are not currently in use by the system. I/O device 66 is coupled to the CPU 52 and may be a network card, a printer 30 port, modem, etc. Additionally there may be a multiplicity of I/O devices such as I/O device 66 coupled to the computer system 50. Design and construction of computer systems such as computer system 50 will be well known to those skilled in the art.

Figure 2:
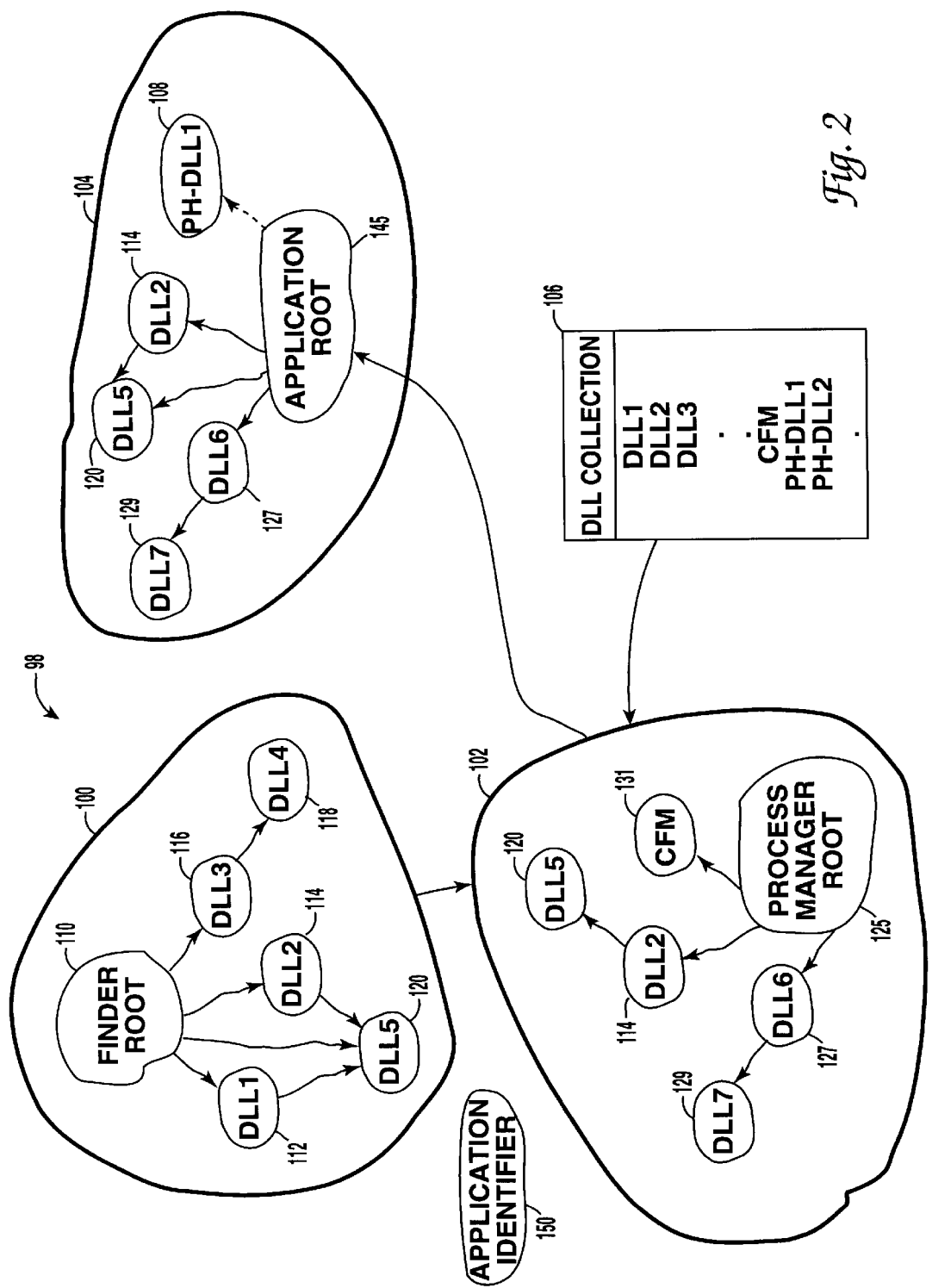
FIG. 2 is a pictorial illustration showing a binding system in accordance with one specific embodiment of the present invention, the binding system including a Finder process, a process manager process, and an application process, wherein the application process has a phantom dynamically linked library.

Turning next to FIG. 2, one specific embodiment of a binding system 98 in accordance with the present invention will be described.

Also shown in FIG. 2 is one structure 104 for an executable process including a phantom DLL in accordance with another embodiment of the present invention. As shown in FIG. 2, the binding system 98 is implemented within an operating system having features similar to the well known Macintosh® Operating System for the PowerPC. For a more detailed description of the Macintosh® Operating System for the PowerPC see "Inside Macintosh: PowerPC System Software" © 1994 Apple Computer, Inc., which is incorporated herein by reference in its entirety.

In the embodiment of FIG. 2 the structure 104 is an application 104. The binding system 98 includes a Finder 100, a process manager 102, the application 104, and at least one collection of DLLs such as DLL collection 106. The application 104 is a process which includes a data closure and an executable process; application 104 also includes a phantom DLL 108.

As will be appreciated, the Finder 100 is a basic Macintosh® 25 application which displays the Macintosh® desktop and launches other programs at the request of the user. The Finder 100 includes an executable process and data closure which is created from a root fragment called Finder root 110 and a plurality of standard DLLs such as DLL1 112, DLL2 114, DLL3 116, DLL4 118, and DLL5 120. Note that DLLs such as DLL1 112, DLL2 114, DLL3 116 and DLL5 120 are brought into the closure by direct reference in the Finder root 110. However, other DLLs such as DLL4 118 may be introduced into the closure by reference in other DLLs. Thus, regardless of whether or not they are found in the root fragment, all import symbols present in the closure are resolved. Furthermore, note that each of DLL1 112, DLL2 114, and the Finder root 110 import symbols from DLL5 120, but only one instance of DLL5 120 is required within the closure.

The process manager 102 is the component of the operating system which manages creation, scheduling and execution of processes. The process manager 102 includes an executable process and data closure which is created from a root fragment process manager root 125 and a plurality of DLLs such as DLL2 114, DLL5 120, DLL6 127, and DLL7 129. The code fragment manager 131 is a specific DLL which serves as the binding manager in the embodiment of FIG. 2.

The application 104 includes an executable process and a data closure created from application root 145 and DLLs such as DLL2 114, DLL5 120, DLL6 127, DLL7 129, and phantom DLL 108. Fragments DLL2, DLL5 120, and DLL6 127 are brought into the closure because they are directly referenced in the application root 145, whereas DLL7 129 is brought into the closure because it is directly referenced in DLL6 127. However, phantom DLL 108 is not referenced in any of the DLLs present in the application 104 but has been pushed into the closure.

For the sake of explanation, assume that the Finder 100 and process manager 102 of FIG. 2 are installed and executing in the computer system environment 98. As will be appreciated, this simply corresponds to a normal operating condition on a Macintosh® incorporating a PowerPC processor. The application 104 would then be started as follows. Using the Finder 100, a user selects the application 104 (somehow indicating a corresponding application identifier 150) and requests that the application 104 be launched.

As will be appreciated, one method for selecting and launching an application involves the user selecting an application icon with a mouse and double-clicking on the icon. In the Macintosh® computing environment, an application may be represented on the screen by an icon. Using a mouse (or other pointing device) to position a cursor over the icon and depressing the mouse button once will select the application. Rapidly depressing the mouse button twice (i.e. double-clicking) will launch the application. In any event, the Finder 100 calls the process manager 102 to invoke a "create new process" function. Additionally, the Finder passes the application identifier 150 and/or other necessary information as parameters to the process manager 102.

In turn, the process manager 102 will ask the code fragment manager 131 to bind the application root 145 to the new process. In essence, the code fragment manager 131 will then attempt to resolve all import symbols found in the application root 145 and standard DLLs subsequently included in the application closure. If the code fragment manager 145 fails the binding process, this may result in a failure to launch the application 104 and a dialogue box may be displayed providing the user with any relevant information.

Once the standard DLLs have been added and prepared in the application 104, the application 104 is ready for execution. All the functionality the programmer of the application 104 intended the application 104 to include should be present. However, in order to enhance and/or better the functionality of application 104, process manager 102 may go on to selectively add phantom DLLs such as phantom DLL 108. More detailed descriptions regarding the step of selectively adding phantom DLLs are discussed below with reference to FIGS. 3 and 4. In general, the present invention teaches integrating phantom DLLs into new processes such as application 104.

FIG. 2 provided an illustration of specific embodiments of a binding system and process structure in accordance with the present invention. However, the methods and apparatus of the present invention may be applied to any computing environment in which a root code or a root fragment may utilize external code and/or data to enhance, replace, or otherwise alter the root codes functionality. This is described in more detail below with reference to FIG. 3.

Figure 3:
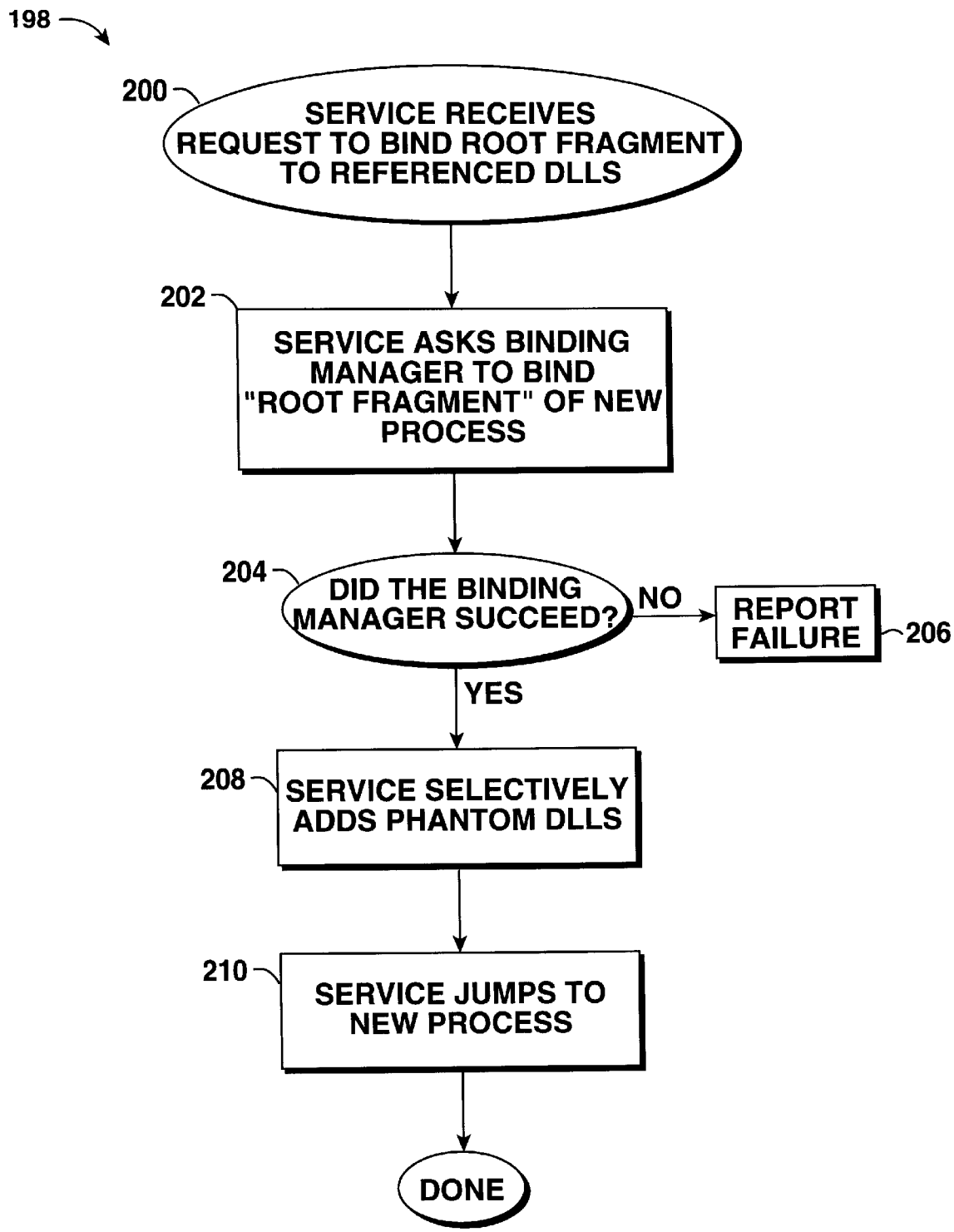
FIG. 3 is a flow chart illustrating one method for a service to bind dynamically linked libraries to a new process in accordance with one aspect of the present invention, the method including a step of selectively binding phantom dynamically linked libraries to the new process.

Next, a method 198 for dynamically binding a root fragment and a plurality of dynamically linked libraries into an executable process will be described with reference to the flow chart of FIG. 3. Note that the description provided for FIG. 2 was a specific embodiment of the present invention and served as a good sample for explaining the present invention. In contrast, the description of FIG. 3 serves to provide a more general embodiment of one method aspect of the present invention.

In a first step 200, a service receives a request to bind a new process to the referenced DLLs. In the example of FIG. 2, the service was the process manager 102 and the new executable process was the requested application 104. In general, the new executable process includes a data closure which has the root fragment (interchangeably called root DLL herein) and will include the appropriate DLLs once the root fragment is prepared to execute. For the purpose of the present invention, a service is any computer entity having an interface which can receive the request to bind call. Other example services include the process manager bootstrapping code and the server manager. The process manager bootstrapping code is code which upon execution generates a process manager 102. The server manager is a process which generates servers in a manner analogous to the process manager generating processes such as applications. In explanation, a "server" is an executable process which does not have an operator interface.

In a next step 202, the service asks a binding manager to bind the root fragment of the new process to the appropriate dynamically linked libraries. The appropriate dynamically linked libraries are determined by two factors: (1) any library associated with an import symbol found in the root fragment; and (2) any library associated with an import symbol found in another library already bound into the new process. Thus the appropriate libraries are all standard DLLs.

One suitable embodiment of the binding manager is the Macintosh® Operating System Code Fragment Manager. As discussed above with reference to FIG. 2, the Code Fragment Manager is itself a dynamically linked library. Thus any service which included the import symbols of the Code Fragment Manager may be able to provide the service of binding new processes to the new code fragment's referenced DLLs. For a more detailed description of the Code Fragment Manager, as well as more details regarding computing environments employing DLLs, see the previously referenced "Inside Macintosh: PowerPC System Software" © 1994 Apple Computer, Inc.

Once the binding manager completes step 202, a step 204 determines if the binding manager was successful in completing the preparation of the new process. If the binding manager fails, then in a step 206, the service may return an error message to the client requesting the binding. Failure may occur for a variety of reasons such as insufficient memory or when a required DLL is missing from the DLL collection.

If the binding manager successfully completes the binding step 202, then in a step 208 the service selectively adds phantom DLLs. A few possible phantom DLL selection criteria will be enumerated following the discussion of FIG.

3 and one particular selection strategy will be described in more detail below with respect to FIG. 4. After step 208 is complete, the portion of the binding process pertinent to the present invention is complete. However, further steps may be performed following step 208 depending on the specific application being implemented. In one suitable next step, such as step 210, the service jumps to the new process which in turn begins executing. In other suitable steps, the parameters of the new process may be published over a network or simply stored on disk.

A variety of selection strategies for adding phantom DLLs as in step 208 of FIG. 3 will now be described. In a first strategy, a list of all phantom DLLs is developed by the operating system (or any suitable entity) and stored in memory on the computer system. The most simple selection strategy involves adding all of the phantom DLLs to every new process. This embodiment, however, tends to be inefficient since each new process may include instances of DLLs which the new process never uses. Furthermore, this "shotgun" approach of adding each and every phantom DLL may produce unwanted results as certain phantom DLLs may add unexpected functionality. For example, one particular phantom DLL may solve a known operating system error. However, an application may be written to compensate for the known error. Thus introducing the phantom DLL which solves the known operating system error might actually result in a different error within the application.

In a more robust phantom DLL selection strategy, the computer system stores a list of standard DLLs which have a corresponding set of one or more phantom DLLs which should be added to the process if the corresponding standard DLL is present in the process. Accordingly, once the standard DLLs have all been bound to the new process, the service checks to see if any of the standard DLLs having corresponding sets are present in the process closure. Then, for each DLL found in the new process, the service adds the corresponding set of one or more phantom DLLs. In another strategy with a similar approach it is determined, for each phantom DLL available, if the particular phantom DLL was intended to be a patch. If so, it is further determined if the DLL which the particular phantom DLL was intended to patch is present. Then, if the standard DLL which the particular phantom DLL patched is present, the service would add the particular phantom DLL being evaluated.

Yet another phantom DLL selection strategy has each phantom DLL determining for itself if it is to be added. Thus, when the binding manager processes a given phantom DLL, the given phantom DLL could contain its own list of criteria and evaluate the environment in which it is being requested to bind. The particular phantom DLL can then add or not add itself based upon these criteria. In situations where there are numerous mitigating factors (which is often the case), this last selection strategy appears to be the best.

Figure 4:
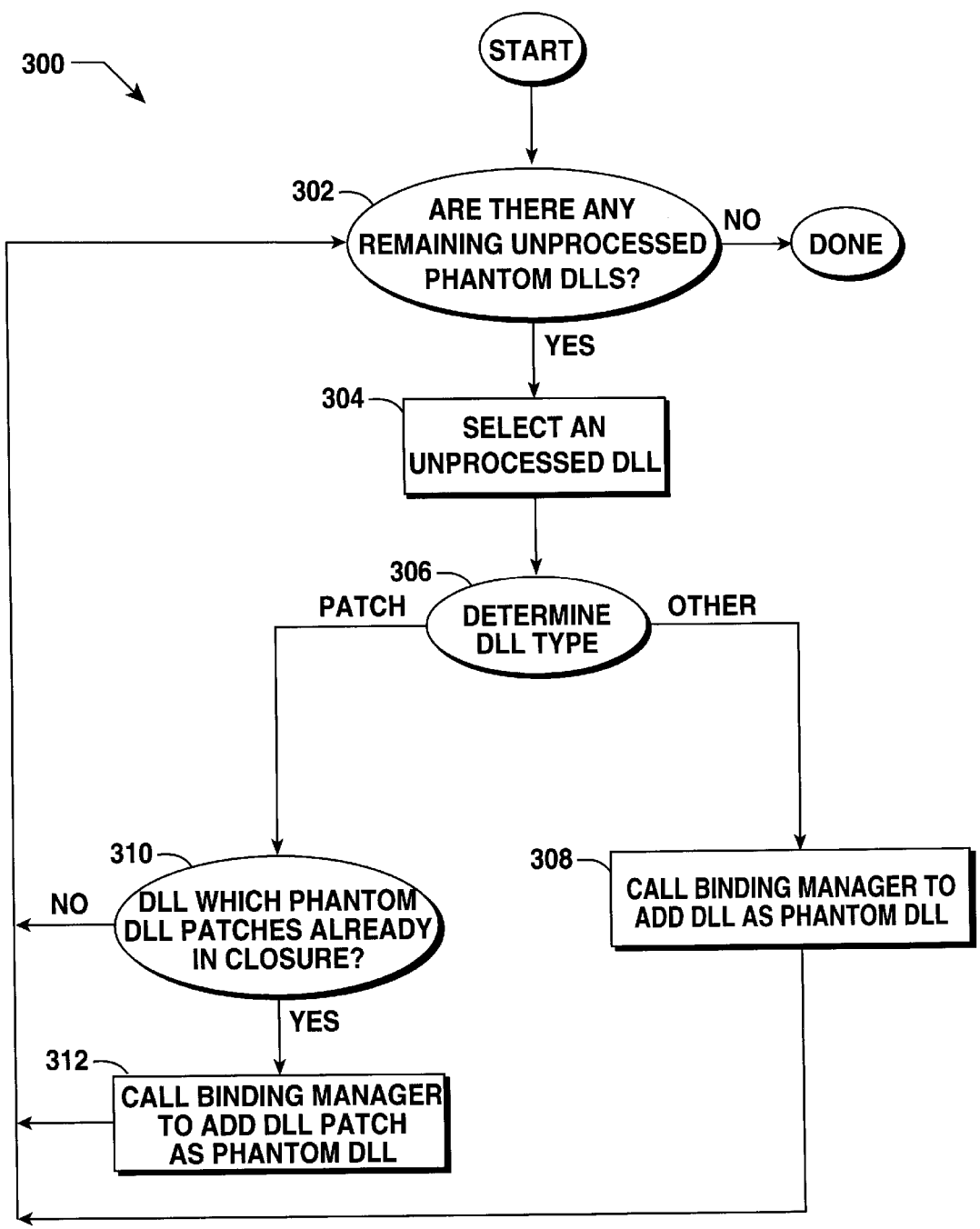
FIG. 4 is a flow chart illustrating a method for performing the selective addition of phantom DLLs step 208 of FIG. 3 in accordance with another aspect of the present invention.

With reference to FIG. 4, a method 300 for selectively adding phantom DLLs to a new executable process (as in step 208 of FIG. 3) in accordance with one aspect of the present invention is illustrated. In an initial substantive step 302, it is determined if there are any remaining phantom DLLs to be processed. On the first entry into step 302, it is simply determined if there are any phantom DLLs available to add and, if so, an appropriate unprocessed phantom DLL is selected in a step 304. The available phantom DLLs of step 302 may be provided through a variety of strategies. In a couple of suitable examples a list of all phantom DLLs or a list of all phantom DLLs which correspond to standard DLLs already present in the new process may be provided. However, on subsequent occurrences of the step 302, the service will determine which of the available phantom DLLs have been processed and, if any are left, selective addition of the phantom DLLs continues in step 304 where another unprocessed phantom DLL is selected for further processing.

It is noted that when a new phantom DLL is added (which may occur in steps 308 and 312 as described below) into the data closure, each previously processed phantom DLL which was not previously added into the data closure must now be "re-processed." Thus the question "Are there any remaining unprocessed phantom DLLs?" of step 302 is more subtle than determining if each phantom DLL has been selected in step 304. This is because a newly added phantom DLL may itself require, or in turn introduce another DLL which may require, a phantom DLL which the selection process of FIG. 4 will only properly include if it evaluates all the available phantom DLLs which have not yet been added.

Once an unprocessed phantom DLL has been selected, the service determines in a step 306 if the selected phantom DLL is intended to be a patch. If the selected phantom DLL is not intended to be a patch, then in a step 308 the binding manager is called to add the DLL to the closure corresponding to the new process. Note that step 308 enables the selected phantom DLL to self-determine whether or not it gets added to the closure. Further note that failure to add a phantom DLL is not necessarily an error. In contrast, when a standard DLL fails to bind, this is typically an error since the binding manager is precluded from resolving all the import symbols present in the fragment. This contrast makes sense as a fragment requires all of its import symbols to be resolved in order to be prepared to execute, yet any phantom DLLs, while perhaps beneficial, are extraneous.

Additionally in step 308, the binding manager will execute an anonymous initialization routine which may be present in the phantom DLL. Executing the anonymous initialization routine allows the phantom DLL execute within the new process thereby having any desired impact on the environment of the new process.

In any event, once the selected phantom DLL has been given the opportunity to bind, it is marked as processed and control returns back to the loop control step 302. Note that marking a phantom DLL as processed could be as simple as incrementing a pointer through a contiguous list of available phantom DLLs.

If in step 306 it is determined that the selected phantom DLL is intended to be a patch, then control is passed to a step 310. In step 310 it is determined if the DLL which the phantom DLL is intended to patch is present in the closure associated with the new process. If the appropriate DLL is not present in the closure, then control returns to the loop control step 302. If the appropriate standard DLL is present then, in a step 312, the binding manager is called in order to add the phantom DLL as a phantom patch to the appropriate DLL. Again, as in step 308, the binding manager may execute an anonymous initialization routine present in the phantom DLL. After step 312, control is passed back to the loop control step 302.

Although only a few embodiments of the present invention have been described, it should be understood that the present invention may be embodied in many other specific forms without departing from the true spirit or scope of the invention. It should also be noted that there are many different ways of implementing both the method and the apparatus of the present invention.

For example, the binding manager was discussed in FIG. 2 as being a dynamically linked library which was imported into the process manager 102. However, in other embodiments, the binding manager may be a distinct process executing on the computer system. This holds true for the more general case of an arbitrary computer service requesting the binding manager to bind a new process to DLLs. In general, the binding manager may be included in the service or it may be a distinct computer entity.

With regards to the embodiment of FIG. 2, the new executable process included a root fragment, standard DLLs, and a phantom DLL. However, in other embodiments of the present invention (including those based on the Finder and the process manager) a new executable process produced by a binding system may consist of only a root fragment and a phantom DLL. This is the situation when the new executable process' functionality is contained wholly in the root fragment (i.e. root functionality).

It should also be appreciated that the enumerated list of phantom DLL selection strategies and criteria is not intended to be exhaustive. While the described selection strategies and criteria are suitable, those skilled in the art will realize that there are a large variety of methods for selectively adding phantom DLLs into a process which fall within the scope of the present invention. For example, the binding manager may evaluate system resources such as available memory and subsequently determine whether or not to add phantom DLLs.

Thus the examples described are to be considered as illustrative and not restrictive. Furthermore, the present invention is not to be limited to the details given herein, but may be modified within the scope of the appended claims.

I claim:

1. A method for dynamically binding a root fragment and a plurality of dynamically linked libraries into an executable process on a computer system comprising the steps of:

storing a DLL collection of standard dynamically linked libraries and phantom dynamically linked libraries in a memory of a computer system;

receiving a bind command within an operating system function executing on said computer system to bind dynamically linked libraries with a root fragment into a new executable process, said operating system function initiating a binding manager executing on said computer system to perform the binding process, said binding manager having access to said DLL collection;

determining within said binding manager which standard dynamically linked libraries are needed by said root fragment, wherein said standard dynamically linked libraries are known to at least one of said root fragment and another of said standard dynamically linked libraries; and determining which phantom dynamically linked libraries are to be used within said executable process, wherein said phantom dynamically linked libraries are not known to either of said root fragment or said standard dynamically linked libraries needed by said root fragment.

2. A method as recited in claim 1 wherein said step of determining which phantom dynamically linked libraries are to be used within said executable process includes the substeps of:

selecting a phantom dynamically linked library; and determining that said selected phantom dynamically linked library is to be used within said executable process if said selected phantom dynamically linked library is intended to patch a first dynamically linked library, said first dynamically linked library being selected from a set of libraries including at least said root fragment, said standard dynamically linked libraries needed by said root fragment, and any phantom dynamically linked libraries which have been determined to be used within said executable process.

3. A method as recited in claim 2 wherein said step of determining which phantom dynamically linked libraries are to be used within said executable process further includes the substep of determining that said selected phantom dynamically linked library is not to be used within said executable process if it is determined that said selected phantom dynamically linked library is intended to patch said first dynamically linked library and if said first dynamically linked library is not needed by said root fragment.

4. A method as recited in claim 2 wherein it is determined that said selected phantom dynamically linked library is intended to patch said first dynamically linked library and that said first dynamically linked library is needed by said root fragment, the method further including the step of asking said binding manager to include said selected phantom dynamically linked library within said executable process.

5. A method as recited in claim 2 wherein it is determined that said selected phantom dynamically linked library is not intended to patch a dynamically linked library, the method further including the step of asking said binding manager to include said selected phantom dynamically linked library within said executable process.

6. A method as recited in claim 5 wherein said selected phantom dynamically linked library is operable to self-determine if it is to be used in said executable process.

7. A method as recited in claim 1 wherein said step of determining which phantom dynamically linked libraries are to be used within said executable process includes the substep of each phantom dynamically linked library self-determining if it is to be used in said executable process.

8. A method as recited in claim 1 further including the step of storing a list of dynamically linked libraries each having a corresponding set of at least one phantom dynamically linked library, wherein said step of determining which phantom dynamically linked libraries are to be used within said executable process includes the substeps of:

determining which dynamically linked libraries from said list are needed by said root process; and for each dynamically linked library from said list which is needed by said root process, determining that said corresponding set of at least one phantom dynamically linked library is to be used within said executable process.

9. A method as recited in claim 8 further including the step of asking said binding manager to include each corresponding set of at least one phantom dynamically linked library which is determined to be used within said executable process.

10. A method as recited in claim 1 wherein said operating system function is a process manager which is operable to provide access to said DLL collection and further manage scheduling and execution of a plurality of processes, said process manager having a process manager root bound to a plurality of dynamically linked libraries, wherein one of said plurality of dynamically linked libraries is said binding manager.

11. A method as recited in claim 1 wherein one of said phantom dynamically linked libraries calls at least one of said root fragment and said standard dynamically linked libraries to register its existence within said executable process.

12. A method as recited in claim 11 wherein said operating system function is an event manager which allows said operating system to monitor computer system inputs and said one of said phantom dynamically linked libraries is a virtual user, said virtual user operable to drive said event manager in such a way that said virtual user mimics operations which a user of said computer system may perform, said operations including pointing with a mouse, typing on a keyboard, and depressing a keypad.

13. A method as recited in claim 1 wherein said step of determining which phantom dynamically linked libraries are to be used within said executable process is performed by said binding manager.

14. A structure for an executable process comprising:
  a root fragment including a root functionality of a desired process; and
  at least one phantom dynamically linked library bound to said executable process, wherein said at least one phantom dynamically linked library performs a phantom library function that is not known by said root fragment,
  wherein the combination of said root fragment and said at least one phantom dynamically linked library comprises an executable process on a computer system.

15. A structure as described in claim 14 further including at least one standard dynamically linked library bound to said root fragment, said at least one standard dynamically linked library including a desired library function that is known and called by said root functionality.

16. A structure as described in claim 15 wherein said root fragment comprises:
  a call symbol to an import symbol corresponding to said desired library function; and
  a table of contents including said import symbol and a pointer to said desired library function.

17. A structure as described in claim 14 wherein said at least one phantom dynamically linked library is a patch operable to augment a given function already implemented on said computer system.

18. A structure as described in claim 14 wherein said at least one phantom dynamically linked library is a patch operable to replace a given function already implemented on said computer system.

19. A structure as described in claim 14 wherein said at least one phantom dynamically linked library is operable to call said root fragment during execution of said executable process.

20. A structure as described in claim 19 wherein said call is arranged to register said at least one phantom dynamically linked library with said root fragment.

21. A computer system comprising:
  a central processing unit;
  memory accessible by said central processing unit; and
  at least one executable process implemented on said central processing unit and said memory, said at least one executable process having a structure as described in claim 14.

22. A binding system for binding dynamically linked libraries to a root process comprising:
  a computer system including a central processing unit and memory coupled to said central processing unit;
  a DLL collection stored in said memory, said DLL collection including standard dynamically linked libraries and phantom dynamically linked libraries;
  a root fragment stored in said memory;
  a binding manager stored in said memory and executing on said central processing unit, said binding manager having access to said DLL collection and said root fragment, said binding manager determining which standard dynamically linked libraries are needed by said root fragment, wherein said standard dynamically linked libraries are known to at least one of said root fragment and another of said standard dynamically linked libraries; and
  a service stored in said memory and executing on said central processing unit, said service having access to said DLL collection and said root fragment, said service determining which phantom dynamically linked libraries are to be used with said root fragment, wherein said phantom dynamically linked libraries are not known to either of said root fragment or said standard dynamically linked libraries.

23. A binding system as recited in claim 22 wherein said binding manager and said service are one computer process.

24. A binding system as described in claim 22 wherein said root fragment comprises:
  a call to an import symbol corresponding to a desired library function from a standard dynamically linked library; and
  a table of contents including:
    said import symbol; and
    a data field corresponding to said import symbol, said data field intended to hold a pointer to said desired library function.

25. A binding system as described in claim 24 wherein said binding manager is operable to store a pointer to said desired library function in said data field.

26. A binding system as described in claim 22 wherein at least one phantom dynamically linked library which is determined to be used with said root fragment is a patch operable to augment a given function already implemented on said computer system.

27. A method for dynamically binding a root fragment and a plurality of dynamically linked libraries into an executable process on a computer system comprising the steps of:
  (a) storing a DLL collection of standard dynamically linked libraries and phantom dynamically linked libraries in a memory of a computer system;
  (b) receiving a bind command within a service executing on said computer system to bind dynamically linked libraries with a root fragment into a new executable process, said service initiating the binding process;
  (c) determining which standard dynamically linked libraries are needed by said root fragment, wherein said standard dynamically linked libraries are known to at least one of said root fragment and another of said standard dynamically linked libraries, said phantom dynamically linked libraries not known to either of said root fragment or said standard dynamically linked libraries needed by said root fragment;
  (d) selecting an unprocessed phantom dynamically linked library;
  (e) determining if said selected phantom dynamically linked library is intended to patch a one of said standard dynamically linked libraries needed by at least one of said root fragment and another of said standard dynamically lined libraries needed by said root fragment, and, if so, requesting that said selected phantom dynamically linked library be added into said executable process;
  (f) requesting that said selected phantom dynamically linked library be added into said executable process if it is determined in step (e) that said selected phantom dynamically linked library is not intended to patch;

(g) marking said selected phantom dynamically linked library as processed;

(h) marking each phantom dynamically linked library which has not been added into said executable process as unprocessed when said selected phantom dynamically linked library is added to said executable process in step (e); and (i) repeating steps (d)–(h) until each of the phantom dynamically linked libraries are marked as processed.

* * * * *